(12) United States Patent
Liu et al.

(10) Patent No.: US 7,418,007 B1
(45) Date of Patent: Aug. 26, 2008

(54) METHOD AND APPARATUS FOR DETERMINING A TRANSMISSION BIT RATE IN A STATISTICAL MULTIPLEXER

(75) Inventors: Vincent Liu, San Diego, CA (US);
Siu-Wai Wu, San Diego, CA (US);
Michael Casteloes, Poway, CA (US);
Robert J. Stone, Poway, CA (US);
Rebecca Lam, San Diego, CA (US)

(73) Assignee: General Instrument Corporation, Horsham, PA (US)

( * ) Notice: Subject to any disclaimer, the term of this patent is extended or adjusted under 35 U.S.C. 154(b) by 1224 days.

(21) Appl. No.: 09/666,901

(22) Filed: Sep. 20, 2000

(51) Int. Cl.
*H04J 3/16* (2006.01)
*H04J 3/02* (2006.01)
*H04N 7/12* (2006.01)
*H04B 1/66* (2006.01)
*H04B 14/04* (2006.01)

(52) U.S. Cl. .................. 370/468; 370/537; 348/385.1; 375/240.05; 375/242

(58) Field of Classification Search .............. 370/282, 370/468, 465, 535–538; 375/240, 240.1, 375/240.05, 240.24; 348/385.1
See application file for complete search history.

(56) References Cited

U.S. PATENT DOCUMENTS

| | | | |
|---|---|---|---|
| 5,159,447 A * | 10/1992 | Haskell et al. ......... | 375/240.05 |
| 5,216,503 A | 6/1993 | Paik et al. | |
| 5,550,590 A | 8/1996 | Sakazawa et al. | |
| 5,606,369 A * | 2/1997 | Keesman et al. ....... | 375/240.01 |
| 5,708,664 A * | 1/1998 | Budge et al. ................ | 370/465 |
| 5,761,398 A | 6/1998 | Legall | |
| 5,793,425 A * | 8/1998 | Balakrishnan ............. | 370/468 |
| 5,861,919 A * | 1/1999 | Perkins et al. ........... | 348/385.1 |
| 5,929,916 A | 7/1999 | Legall et al. | |
| 5,933,450 A | 8/1999 | Ozkan et al. | |
| 5,963,256 A * | 10/1999 | Tahara ..................... | 348/385.1 |

(Continued)

FOREIGN PATENT DOCUMENTS

EP 0 685 971 12/1995

(Continued)

OTHER PUBLICATIONS

Wang, Limin, et al., "Bit Allocation and Constraints for Joint Coding of Multiple Video Programs", IEEE Transactions on Circuits and Systems for Video Technology, vol. 9, No. 6, Sep. 1999, pp. 949-959.

*Primary Examiner*—Steven H Nguyen
(74) *Attorney, Agent, or Firm*—Larry T. Cullen

(57) ABSTRACT

A statistical multiplexer for coding and multiplexing multiple channels of digital television data, or multiple panels of HDTV digital television data. A bit rate need parameter is determined for each encoder in a stat mux group, and an encoding bit rate is allocated to each channel based on its need parameter. A transmission bit rate is allocated to each channel as a time-lagged version of its need parameter to minimize a rate mismatch between the output and the input of a decoder buffer. A packet processor checks for impending decoder buffer overflow or underflow events to set minimum and maximum limits on the transmission bit rate. Moreover, these limits are set based on whether a new transmission bit rate can be implemented before the decoding time stamp (DTS) of the current or next frame.

9 Claims, 7 Drawing Sheets

U.S. PATENT DOCUMENTS

| | | |
|---|---|---|
| 6,023,296 A | 2/2000 | Lee et al. |
| 6,055,270 A | 4/2000 | Ozkan et al. |
| 6,167,084 A | 12/2000 | Wang et al. |
| 6,493,388 B1 | 12/2002 | Wang |
| 6,504,850 B1 * | 1/2003 | Kato et al. ............... 370/465 |
| 6,529,550 B2 * | 3/2003 | Tahara et al. ............. 375/240 |
| 6,594,271 B1 | 7/2003 | Wu et al. |

FOREIGN PATENT DOCUMENTS

| | | |
|---|---|---|
| EP | 0 804 035 | 10/1997 |
| FR | 2 790 899 | 9/2000 |

* cited by examiner

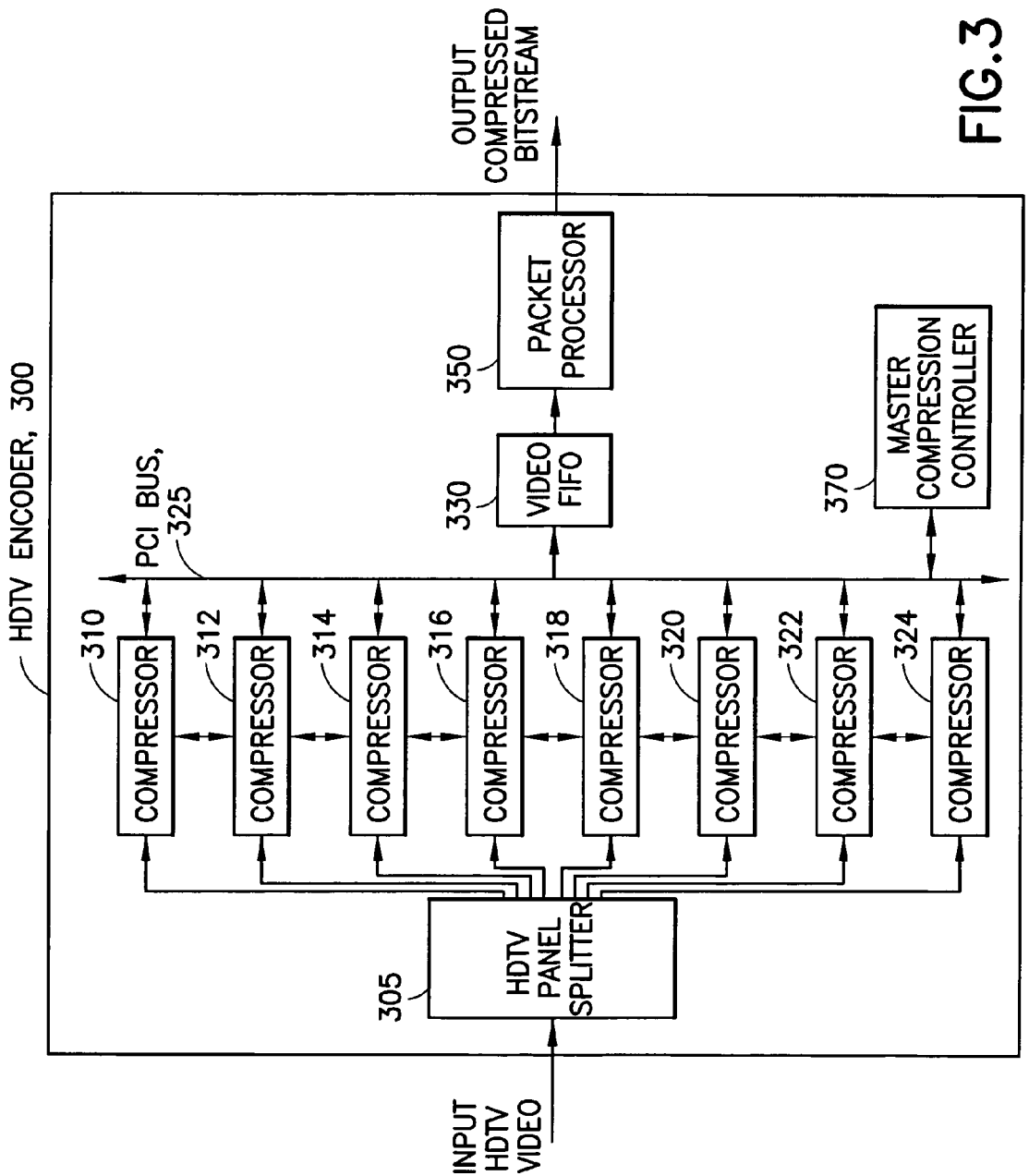

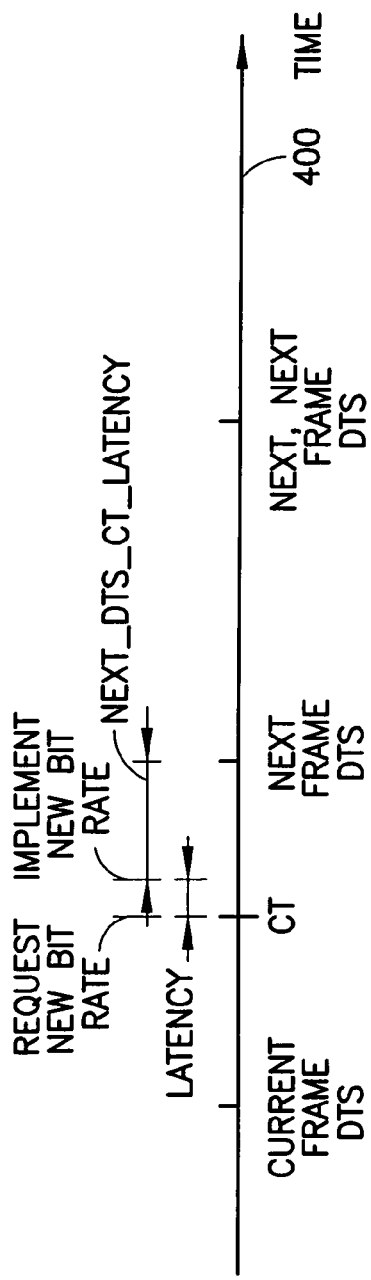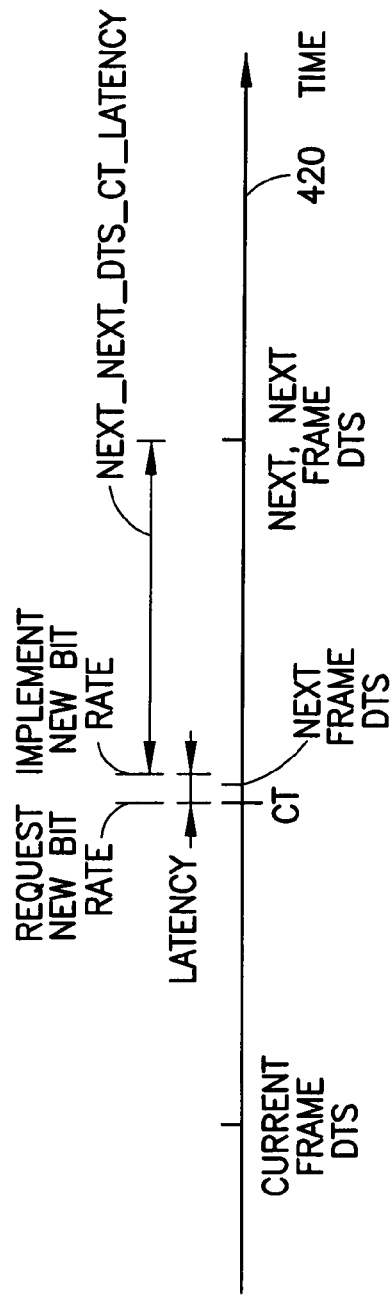

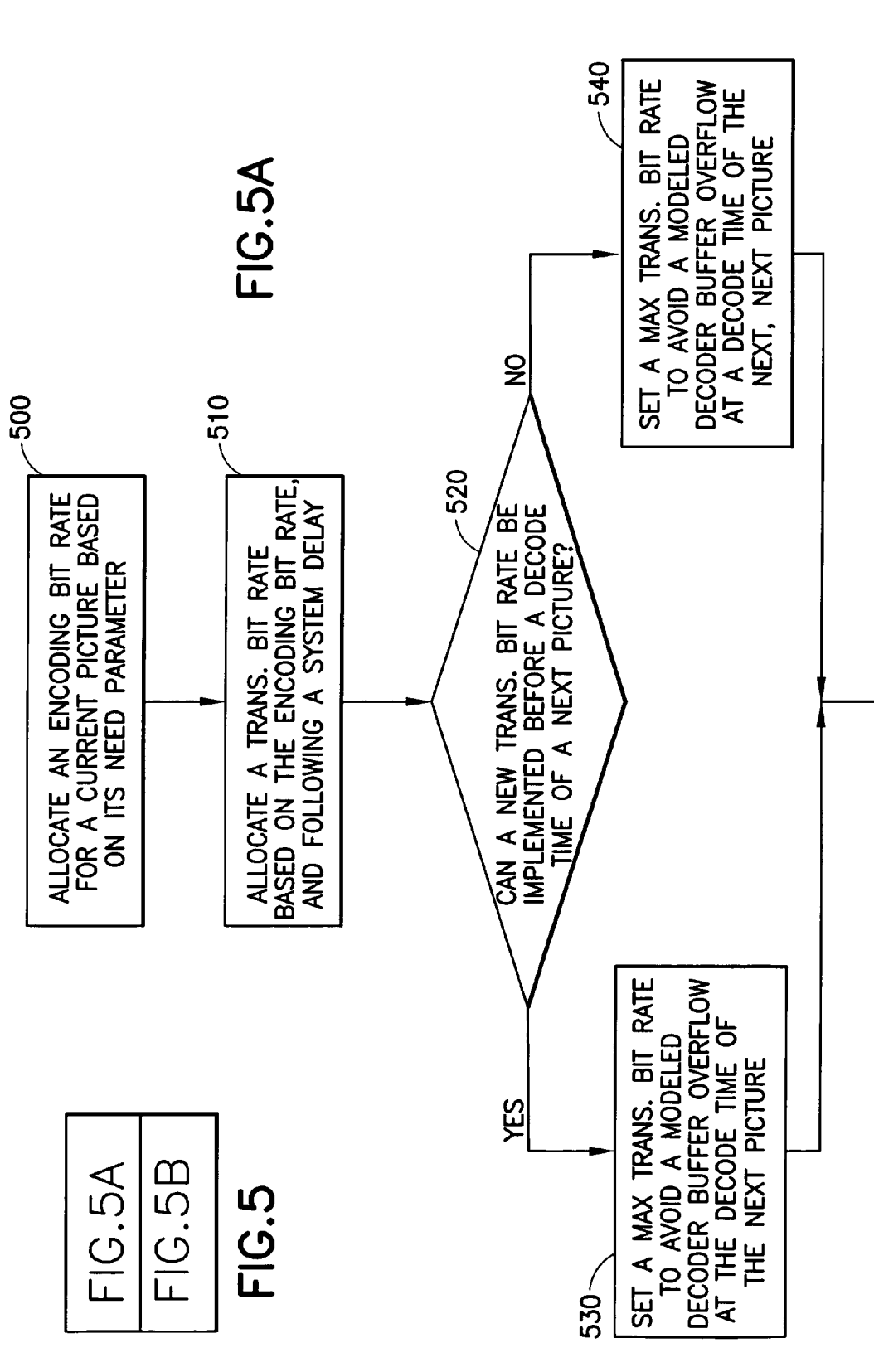

METHOD AND APPARATUS FOR DETERMINING A TRANSMISSION BIT RATE IN A STATISTICAL MULTIPLEXER

BACKGROUND OF THE INVENTION

The present invention relates to a statistical multiplexer for coding and multiplexing multiple channels of digital television data.

Digital television has become increasingly popular due to the high quality video image it provides, along with informational and entertainment features, such as pay-per-view, electronic program guides, video-on-demand, stock, weather and stock information, Internet hyperlinks, and so forth. Such television data can be communicated to a user, for example, via a broadband communication network, such as a satellite or cable television network, or via a computer network.

However, due to the bandwidth limitations of the communication channel, it is necessary to adjust a bit rate of the digital video programs that are encoded and multiplexed for transmission in a compressed bit stream. A goal of such bit rate adjustment is to meet the constraint on the total bit rate of the multiplexed stream, while also maintaining a satisfactory video quality for each program.

Accordingly, various types of statistical multiplexers have been developed that evaluate statistical information of the source video that is being encoded, and allocate bits for coding the different video channels accordingly. For example, video channels that have hard-to-compress video, such as a fast motion scene, can be allocated more bits, while channels with relatively easy to compress scenes, such as scenes with little motion, can be allocated fewer bits.

However, there is a need for an improved statistical multiplexing system. Such a system should employ a number of individual encoders that encode data from a number of incoming channels of source video data. This data may be obtained from a storage media, live feed, or the like.

The system should dynamically allocate bits to the individual encoders to encode frames of video data from the channels.

The system should distinguish between an encoding bit rate allocation and a transmission bit rate allocation.

The system should assign a transmission bit rate to each video channel to prevent a mismatch between the input and output bits of a modeled decoder buffer.

Moreover, the system should check for impending decoder buffer overflow or underflow events to set minimum and maximum limits on the transmission bit rate. These limits should be set based on whether a new transmission bit rate can be implemented before the decoding time stamp (DTS) of the current or next frame.

The system should be usable with essentially any type of video data, including high-definition (HD) and standard-definition (SD) television (TV).

The present invention provides a system having the above and other advantages.

SUMMARY OF THE INVENTION

The present invention relates to a statistical multiplexer for coding and multiplexing multiple channels of digital television data.

Bandwidth is dynamically allocated among a number of variable bit rate (VBR) video services that are multiplexed to form a fixed bit rate transport bit stream.

In particular, a transmission bit rate is calculated by delaying an encoding bit rate by an amount equal to a system delay. An upper bound (max) and lower bound (min) are placed on the transmission bit rate to protect the decoder buffer.

The stat mux system includes three distinct parts:

1) The collection of visual characteristics and complexity information for individual video channels and a need parameter is generated for each video channel to indicate how difficult it is to compress that channel. This process is repeated once per frame and it is done by the individual single-channel encoders (which could be SD and/or HD).

2) The most up-to-date need parameters from all the video channels are collected by a quantization level processor (QLP), or rate control processor. The rate control processor assigns an encoding bandwidth to each video channel in the form of an encoding bit rate. Each channel receives a different encoding bit rate based on its need parameter in relation to the needs of all the other channels. The encoding bit rate is used to control the video encoding of individual channels. The rate control processor also assigns transmission bit rates to the channels, which determine how many bits are sent by each video channel to a decoder.

3) The single-channel encoder uses the encoding bit rate it is given to perform video compression. The primary task here is a rate control function, which involves using the encoding bit rate and the relative complexities of different frame-types (i.e., I, B and P types) to assign a target bit budget for each frame it is about to encode.

A particular method for processing a plurality of channels in a statistical multiplexer includes the steps of: allocating an encoding bit rate for coding a current picture of each channel according to a bit rate need parameter thereof, and allocating a transmission bit rate for transmitting the current picture of each channel after encoding thereof. For each channel, the transmission bit rate is allocated in accordance with the channel's encoding bit rate after the encoding bit rate has been allocated to the channel, and following a system delay of a modeled buffer of a decoder, to minimize a rate mismatch between an input and an output of the modeled decoder buffer.

Moreover, min. and max. limits are provided for the transmission bit rate to avoid a potential overflow or underflow of a modeled decoder buffer. These limits take into account a delay in implementing a new bit rate, and also account for whether the new bit rate can be implemented before the decoding time of the current picture, the next picture, and/or the next, next picture.

Note that the pictures can be, e.g., frames or fields.

A corresponding apparatus is also presented.

BRIEF DESCRIPTION OF THE DRAWINGS

FIG. 3 illustrates an encoder for high-definition television data for use in accordance with the present invention.

FIG. 4(a) illustrates a time line where a new maximum transmission bit rate can be implemented before the decoding time stamp (DTS) of the next frame, in accordance with the present invention.

FIG. 4(b) illustrates a time line where a new maximum transmission bit rate can not be implemented before the decoding time stamp (DTS) of the next frame, in accordance with the present invention.

DETAILED DESCRIPTION OF THE INVENTION

The present invention relates to a statistical multiplexer for coding and multiplexing multiple channels of digital television data.

Figure 1:
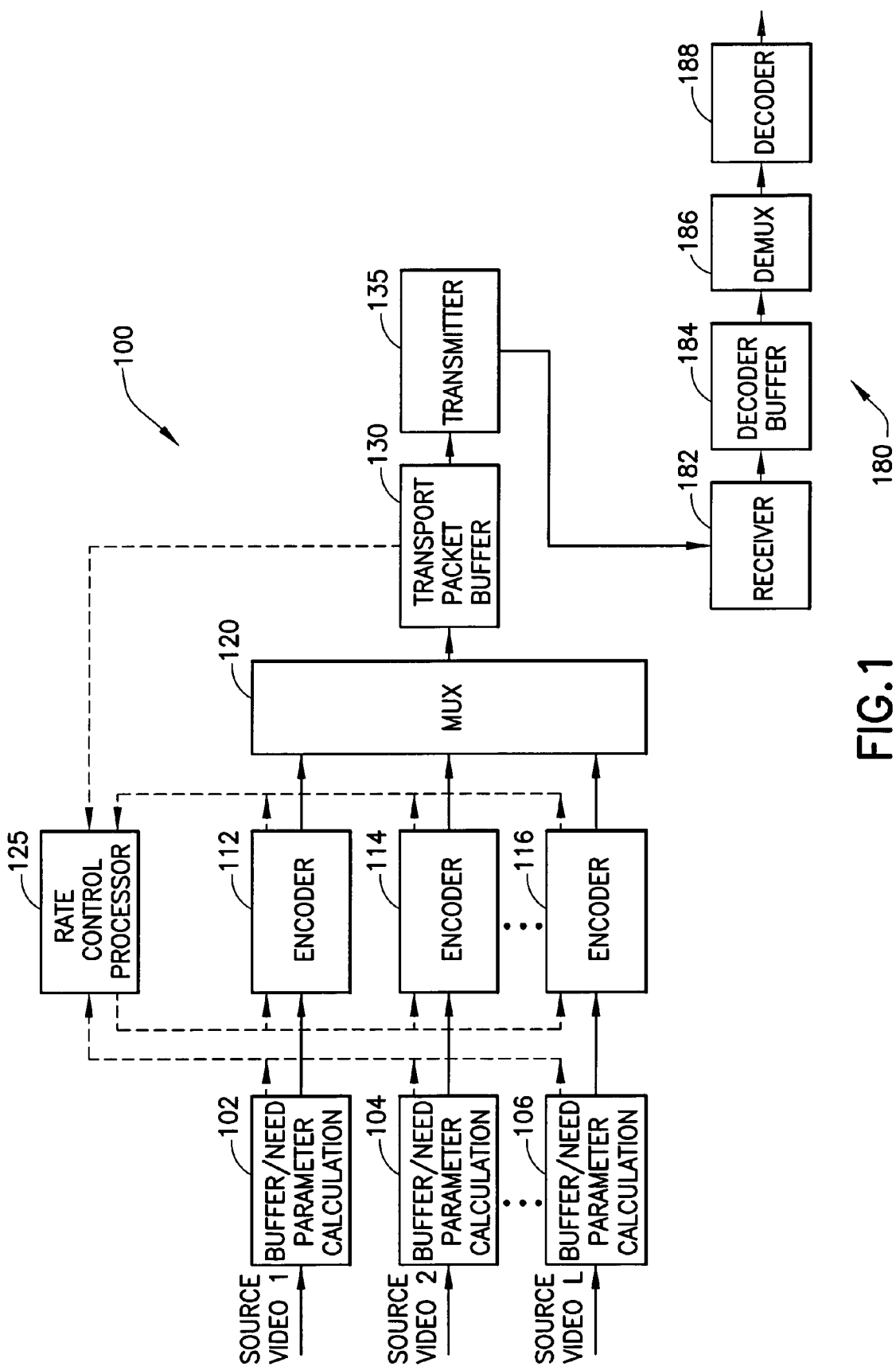
FIG. 1 illustrates a statistically multiplexed multi-channel encoding system for use in accordance with the present invention.

FIG. 1 illustrates a statistically multiplexed multi-channel encoding system for use in accordance with the present invention.

The encoding system 100 includes L buffer/need parameter calculation functions 102, 104, ..., 106 that receive corresponding uncompressed source video inputs. The functions 102, 104, ..., 106 provide the need parameter data to a rate control processor 125, which in turn provides a corresponding encoding bit rate allocation to each of the encoders 112, 114, ..., 116. The encoders may provide feedback information to the rate control processor regarding the actual encoding bit rate. The encoded data is provided to a mux 120 to provide a multiplexed bitstream, then to a transport packet buffer 130, and to a transmitter 135 for transmission across a channel.

The rate control processor 125 may receive a fullness signal from the transport packet buffer 130.

At a decoding side 180, a receiver 182, decoder buffer 184, demux 186, and decoder 188 are provided to output a decoded video signal, e.g., for display on a television.

Figure 2:
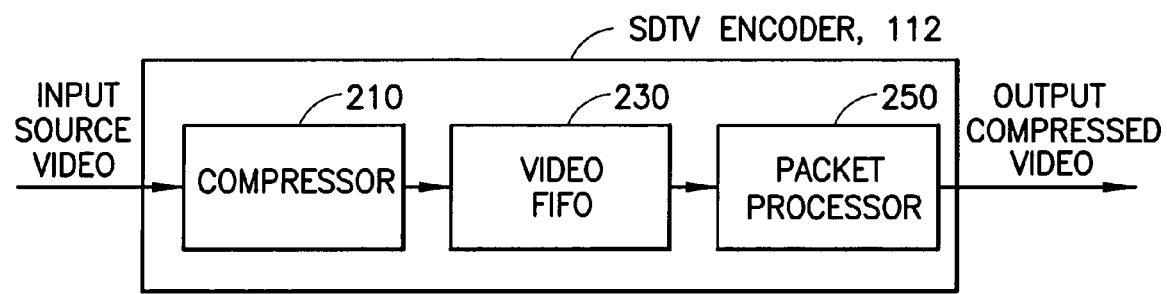
FIG. 2 illustrates an encoder for standard definition television data for use in accordance with the present invention.

FIG. 2 illustrates an encoder for standard definition television for use in accordance with the present invention.

The encoder 112, which is an example one of the encoders 112, 114, ..., 116 of FIG. 1, encodes a single channel of input data, and includes a compressor 210 that performs conventional data compression, including motion compensation (for P- and B-frames), discrete cosine transform (DCT) and quantization. A video first-in, first-out (FIFO) buffer 230 temporarily stores the compressed data, and a packet processor 250 forms packets of the compressed data with appropriate header information, e.g., according to the MPEG-2 or other video standard.

FIG. 3 illustrates an encoder for high-definition television for use in accordance with the present invention.

The encoder 300 encodes a single channel of input data. However, a panel splitter 305 divides up a video frame such that different sub-regions, or panels, of the frame are routed to respective different compressors 310-324. Eight compressors are shown as an example only. Typically, the same sub-region of successive frames is assigned to the same compressor.

A master compression controller (MCC) 370 controls the compression of the data at each compressor via a peripheral component interconnect (PCI) bus 325, and the compressed data is output to a video FIFO 330 for temporary storage. The compressed data is formed into packets for transport at a packet processor 350.

A encoding bit rate need parameter for the HDTV channel is determined by the MCC 370 by summing a need parameter for each of the panel compressors. Other statistical information, such as motion estimation scores and the like, are also summed from each compressor Note that it is possible to combine both SDTV and HDTV encoders in a single stat mux group. In this case, the encoder 300 is an example one of the encoders 112, 114, ..., 116 of FIG. 1. For example, one HDTV encoder may be combined with two or three SDTV encoders in a stat mux group.

Overview

A key part of a statistically multiplexed multi-channel encoding system of the invention is the calculation of the need parameter.

The visual characteristics and complexity information regarding the source video are collected and condensed into a single parameter, which is referred to as the "need parameter". A need parameter is calculated for each video channel, and is updated once per frame whenever a new video frame is processed by the corresponding single-channel encoder 112, 114, ..., 116. Optionally, the need parameter can be updated more often, such as multiple times per frame. Moreover, for field-picture mode, the need parameter can be updated once per field.

Discussion

In the following description of a stat mux, each video service is assumed to provide a picture complexity measure, such as an ME score or activity level, to the rate control processor 125, which handles the tasks of allocating bandwidth for each television service provider (TSP), e.g., channel, and modulating the transmission rates for each channel. In an encoder with look ahead capability, the ME score can be replaced by other measurements such as the actual number of bits coded under a constant quantization level (QL).

For the high-definition encoder that processes multiple panels of a frame in parallel, the encoders 112, 114, ..., 116 collect the ME scores from all the panels and compute the sum along with other parameters such as average pixel level (APL), picture resolution, frame rate, frame type (I, B or P) and total intra-frame activity. It also keeps a record of the sizes and average QL for past frames. Based on the information available, plus the look ahead parameters from scene change, fade and film detection, the MCC 370 can derive a need parameter for that video channel.

As the rate control processor 125 receives an updated need parameter from a buffer/need parameter calculation function 102, 104, ..., 106, it reallocates the bandwidths for all the video services based on the latest information. The bandwidth allocation is sent back to each encoder 112, 114, ..., 116 in the form of an encoding bit rate. Moreover, the rate control processor 125 uses the bandwidth allocation to compute bit budgets for encoding. It keeps an approximate video buffering verifier (VBV) model, such as is know from the MPEG standard, to ensure that each frame is encoded within acceptable size limits.

Note that the VBV model is only approximate because the actual transmission rate changes that occur at the decode time of a frame cannot be precisely modeled in advance, at the time of encoding. The rate control processor 125 keeps a bit accurate model of the decoder buffer 184, and if it is given the sizes of each encoded frame along with the decoding time stamp (DTS), the min. and max. limits on the transmission rate can be calculated and used before a transmission rate change is issued. As known from the MPEG standard, a DTS is a field that is present in a PES packet header that indicates the time that an access unit (e.g., picture) is decoded in a system target decoder.

Here, the min. and max. rates are used for decoder buffer protection. Under normal conditions, one expects transmission rate changes to follow (with a time lag) the changes in the encoding rate as communicated by the encoders to the rate control processor. The time lag, or system delay, is the total buffer system delay through both encode and decode buffers, and is assumed to be the same for all video services in the stat mux group. The system delay includes the time between encoding and decoding of a picture. In the case of multiplexing HD and SD channels, their system delays can be approximately the same if a relative weighting of, e.g., five-to-one between HD and SD channels. is assumed.

Since all the video services need not be frame-synchronized, the encoding bit rates and transmission rates are updated as frequently as the rate control processor can handle. Encoding bit rates are passed on (with the buffer system delay) to become the transmission rate for that channel.

1. Assignment of Transmission Bit Rate to Each Video Channel

At the heart of the statistical multiplexing system is the bandwidth allocation process, which is performed by the rate control processor 125. In our stat mux system, a distinction can be made between two different concepts of bandwidth: one is the allocation of bandwidth to each video channel for the purpose of encoding. From the perspective of the rate control processor, each single-channel video encoder is allocated an encoding bit rate (BR) which is used to determine the targeted size to encode a video frame. The single-channel encoder receives updates on its encoding bit rate every QL/BR period, which may occur, e.g., more than ninety times per second. However before encoding a particular video frame, only the latest encoding bit rate is used to calculate the targeted budget size for encoding that frame.

The other bandwidth allocation process in accordance with the invention involves the assignment of transmission bit rate to each video channel. This can also be calculated every QL/BR period, or at a faster or slower rate. The transmission rate for a video channel determines how many bits of compressed video should be sent by that channel during a QL/BR period. The sum of transmission bit rates over all the video channels for a particular QL/BR period should be equal to, or less than, the total video bandwidth given to the stat mux system. Similarly, the sum of encoding bit rates over all the video channels for a particular QL/BR period should be equal to, or less than, the total video bandwidth given to the system.

1.1 Relationship Between Encoding and Transmission Bit Rates

For an MPEG-2 video encoding/decoding system, the concept of buffer system delay refers to the time lag from the time a video frame is first encoded at the encoder to the time that video frame is decoded by the decoder, e.g., as designated by the frame's DTS. For most MPEG-2 systems, the buffer system delay is constant once the encoding/decoding system is configured to a certain bit rate. A constant buffer system delay may also be assumed for the present stat mux system.

Furthermore, the transmission bit rate is chosen to approximately be a time-lagged version of the encoding bit rate. The time lag between the two rates is equal to the buffer system delay.

The reason for this particular choice is as follows. If one ignores any latency in the transmission path between transport packet buffer 130 at the encoding side and the decoder buffer 184, the transmission bit rate is the same as the rate at which video bits arrive at the decoder buffer. Since the encoding bit rate is used in determining the budget for encoding a video frame, one can also think of it as the decoding rate when that particular frame is decoded.

The bit arrival rate at the decoder buffer (i.e., the transmission bit rate) equals the encoding bit rate delayed by the buffer system delay time, and the decoding bit rate also equals the encoding bit rate delayed by the buffer system delay time. Therefore, when a video frame is decoded, the decoding rate (which controls the output rate of the decode buffer) roughly equals the bit arrival rate at the input of the decoder buffer. Therefore, the present invention minimizes any possible rate mismatch between the output and the input to the decoder buffer. In a fixed rate system, this mismatch never occurs since the encoding bit rate and the transmission bit rate are the same fixed rate.

In the above discussion, the encoding/decoding bit rate refers to the rate at which a video frame is encoded/decoded without considering the effects of different frame types. The assignment of bit budgets according to frame types is done by the rate control function at the individual single-channel encoder. For example, for a given encoding bit rate, the rate controller assigns a large bit budget to an I-frame if that is the type for the frame it is about to encode. Conversely, a B-frame is assigned a much smaller bit budget.

1.2 Min and Max Bit Rate Requests from the Packet Processor

Note that the transmission bit rate is only approximately a time-lagged version of the encoding bit rate. The rate control processor 125 has the freedom to set the transmission bit rate differently if necessary. When the transmission bit rate deviates from the encoding bit rate, the frames that are already encoded and stored in the transport packet buffer 130 may cause the decoder buffer 184 to overflow or underflow. This is because those frame were originally encoded under the assumption that the transmission rate follows the encoding bit rate exactly. The transmission rate may deviate from the encoding bit rate for several reasons, e.g., temporary congestion in the transmission network, or imprecision in the actual number of bits sent over a QL/BR period of time.

In the present stat mux system, such deviations are allowed for while still maintaining overflow/underflow protections for the decode buffer. This is achieved by having the packet processor 250 or 350 check for impending overflow/underflow events, and communicates back to the rate control processor 125 through a set of maximum and minimum transmission bit rate requests. The maximum bit rate defines the highest rate at which the packet processor may send video packets for that channel without overflowing that channel's decoder buffer. The minimum bit rate request informs the rate control processor 125 of the lowest rate at which the individual video channel must send its video bits to get the complete video frame over to the decoder before the frame's decoding time starts.

For the packet processor (250 or 350) to compute the min. and max. limits on the transmission bit rate, it needs to keep track of the decoder buffer through a decoder buffer model, including the current status of the buffer, the number of frames in it, the DTS and sizes of each frame, and the DTS and size of the frame that is currently being transmitted.

A picture is transmitted in advance of its DTS time, of course, e.g., up to 0.5 sec before. The picture data is stored in the decoder's buffer prior to being decoded at the DTS time. The DTS is based on a program clock reference (PCR), which is a clock that runs on an encoder board. This time is periodically sent from the encoder to the decoder to synchronize the devices. The PCR clock runs at 27 MHz in a common implementation.

Before each new transmission rate is issued, the rate control (QL) processor 125 polls all the channels for min. and max. allowable bit rates. The packet processor for each channel calculates these limits as follows.

CT is the current time, Next_DTS is the time for the decoder to decode its next frame, and the DTS after that is Next_next_DTS. "Latency", "delay" or "implementation delay" refer to the interval from the current time until the time when the bit rate can be implemented. This delay accounts for factors such as a signal travel time between the packet processor and the rate control processor, and a time for the rate control processor to calculate a new transmission bit rate. The delay depends on the hardware configuration.

The transmission bit rate is updated in successive cycles, which can vary from the cycles for updating the encoding bit rate. Thirty-two transmission bit rate update cycles between DTSs can be used. The interval between DTSs is the inverse of the frame rate, e.g., 1/24 or 1/30 sec. The latency is typically a fraction (e.g., 1/3) of a transmission bit rate update cycle.

The current_br is the transmission bit rate for the current cycle received from the rate control processor 125, and scaled by 184/188 to remove the transport packet header bits. The packet processor of each channel outputs packets according to the transmission bit rate assigned to it. Assume an MPEG transport packet having 184 payload bytes and 4 header bytes is used. However, other transport schemes may be used, in which case this adjustment is modified as required.

In the following equations, current_br is further adjusted by a "margin" of 61 kbits/sec to account for PCR, PES headers and time stamps. For an HDTV encoder, the margin is doubled to 122 kbits/sec. These values, again, are specific to the MPEG coding standard, but the invention is suitable for use with other coding and transmission schemes as well.

The maximum bit rate limit is used to prevent the modeled decoder buffer from overflowing for each channel. The requirement is that the decoder buffer should not overflow at the next DTS time. By monitoring the amount of space in the decoder buffer at the Next_DTS time (decode_buffer_size − decode_buffer), assuming no new bits are transmitted, and adjusting for the latency in the rate control processor's response, the maximum bit rate is given by the amount of empty buffer space divided by the time until the Next_DTS.

Figure 4C:
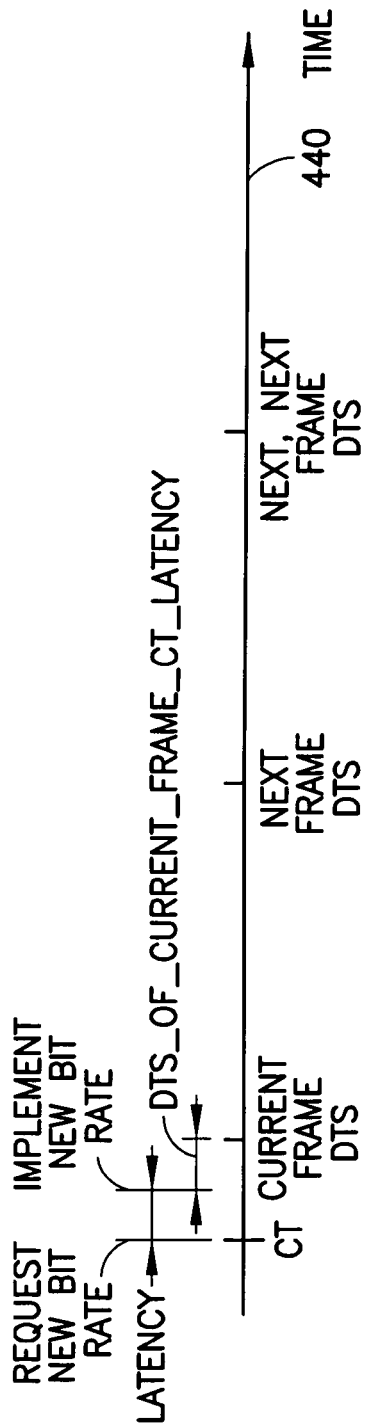
FIG. 4(c) illustrates a time line where a new minimum transmission bit rate can be implemented before the decoding time stamp (DTS) of the current frame, in accordance with the present invention.

The timeline 400 of FIG. 4(a) shows the case where the time for implementing the next transmission bit rate update is prior to the Next_DTS. As shown in the timeline 420 of FIG. 4(b), if the time for implementing the next bit rate update is after the Next_DTS, the buffer overflow condition should be checked for the Next_next_DTS. The maximum bit rate calculation is expressed in the following C-language syntax.

If ( CT + latency) < Next_DTS then
   max_br = ( decode_buffer size− decode_buffer − (current_br +margin) * latency ) /(Next_DTS − CT − latency);
else
   max_br = ( decode_buffer_size − decode_buffer + picture_size_of(picture_at_Next_DTS ) − (current_br + margin)* latency ) / ( Next_Next_DTS − CT −Latency)

When (CT+latency)<Next_DTS, the numerator represents the modeled decoder buffer fullness at time (CT+latency), and the denominator represents the time period between (CT+latency) and (Next_DTS). Max_br is then the bit rate that will consume the remaining buffer space when implemented in the time period between (CT+latency) and (Next_DTS). See FIG. 4(a).

When (CT+latency)≧Next_DTS, the numerator represents the modeled decoder buffer fullness at time (CT+latency), and the denominator represents the time period between (CT+latency) and (Next_next_DTS). Max_br is then the bit rate that will consume the remaining buffer space when implemented in the time period between (CT+latency) and (Next_next_DTS). picture_size_of(picture_at_Next_DTS) is the size (e.g., in bits) of the picture whose DTS is Next_DTS. See FIG. 4(b).

In the code for min. bit rate calculations, below, the term "current frame" refers to the coded video frame that is currently being transmitted. The minimum bit rate is derived from the requirement that the current frame of compressed data must be completely transmitted before the DTS for that frame, otherwise the decoder buffer may underflow during the decoding of that frame. First, check if the next bit rate change occurs before the DTS time of the current frame (i.e. CT + latency < DTS_of_current_frame). If so, as shown in the timeline 440 of FIG. 4(c), it is meaningful to calculate a min_br defined as the minimum constant bit rate required to send the remainder of the frame before the DTS time. If min_br turns out to be zero or less (this could happen if, for a given latency, the no_of_bits_left_current_frame <= current_br * latency) then min_br is set to zero. This means there is no minimum requirement on the new bit rate.

Figure 4D:
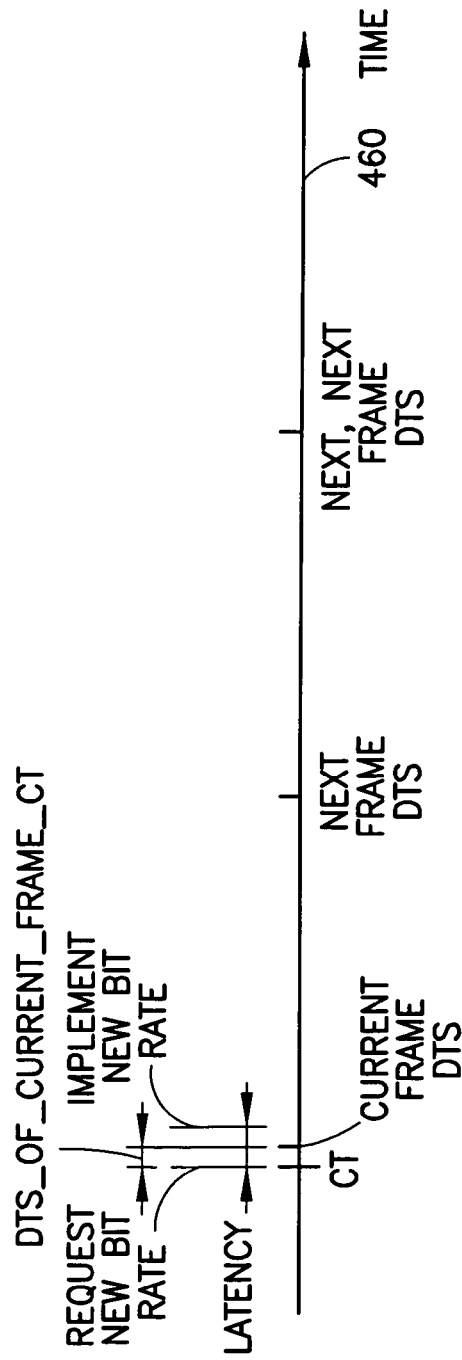
FIG. 4(d) illustrates a time line where a new minimum transmission bit rate can not be implemented before the decoding time stamp (DTS) of the current frame, in accordance with the present invention.

For the special case when the DTS is so close to the current time that CT + latency > DTS_of_current_frame, as shown in the timeline 460 of FIG. 4(d), min_br is not meaningful. In this case, min_br is set to zero if the old bit rate can finish delivering all the remaining bits before DTS occurs; otherwise min_br is set to a large enough value to mitigate any potential decoder buffer underflow problem. The minimum bit: rate calculation is expressed in the following C-language syntax.

If ( latency < DTS_of_current_frame − CT ) then
   min_br = ( no_of_bits_left_current_frame −(current_br − margin) * latency )/
(DTS_of_current_frame − CT − latency);
   If (min_br < 0) then min_br = 0;
else
   If ( No_of_bits_left_current_frame < (current_br − margin) *(DTS_of_current_frame − CT)) then
   min_br = 0;
else
   min_br = HARDWARE_MAX/ 4.

no_of_bits_left_current_frame is the number of bits left to send in the current frame at time CT. When (latency < DTS_of_current_frame − CT), the numerator for min_br represents the number of bits left to send in the current frame at time CT+latency, and the denominator represents the time period between (CT+latency) and (DTS_of_current_frame). Min_br is then the smallest bit rate that will enable the remainder of the current frame to be transmitted when implemented in the time period between (CT+latency) and (DTS_of_current_frame). See FIG. 4(c).

Note that setting min_br=0 essentially maintains the current transmission bit rate.

The code "min_br = HARDWARE_MAX/ 4" denotes a "panic mode" where there is not enough bandwidth to send the rest of the picture across the communication channel to the decoder before the DTS of the current picture. HARDWARE_MAX is 28 Mbits/sec for SD and 39 Mbits/sec for HD. An alternative is to set min_br = (no_of_bits_left_current_frame − (current_br − margin) * latency) / (one_QL-BR_cycle). In this case, whatever is leftover in the current frame must be sent during the new QL/BR cycle.

Note that min and max bit rates are converted back into transport bit rates using a scale factor of 188/184 before they are sent back to the rate control processor, since the rate control processor deals with all transmission bit rates at the transport level.

1.3 A C-Language Syntax for a Transmission Bit Rate Process in Accordance with the Invention (1) Initialize the bit rate parameters to nominal values.
```
for (i=0; i<num_mem; i++){
min_br[i] = nom_br;
max_br[i] = nom_br;
target_br[i] = nom_br;
bit_rate[i] = nom_br;
br_avail = br_avail − nom_br;
}
```
(2) Calculate the total hard minimum transmission bit rate for the stat mux, then bound the minimum and maximum bit rates by the hard limits. Ignore the hard minimum if the total hard minimum exceeds the available bandwidth. Optionally, the user can set individual hard limits for each channel.
```
tot_hmin = 0;
for (i=0; i<num_mem; i++)
tot_hmin = tot_hmin + hminbr[i]; /* total hard minimum */
tot_hmin = 1.5 * tot_hmin;
for (i=0; i<num_mem; i++){
if (min_br[i] < hminbr[i])
    if (tot_hmin < br_avail)
        min_br[i] = hminbr[i];
if (min_br[i] > hmaxbr[i])
    min_br[i] = hmaxbr[i];
if (max_br[i] > hmaxbr[i])
    max_br[i] = hmaxbr[i];
if (max_br[i] < hminbr[i])
    if (tot_hmin < br_avail)
        max_br[i] = hminbr[i];
}
```
(3) If the total minimum bit rate requested by the packet processor 250 (PP) of a channel encoder exceeds the available bandwidth, the rate control processor 125 handles the transmission bit rate allocation differently depending on whether or not the total hard minimum exceeds the available bandwidth. If it does, the bandwidth is allocated in proportion to the minimum bit rate requested by the packet processor. Otherwise, the rate control processor resorts to the hard minimums and allocates the remaining bandwidth in proportional to the difference between the requested minimums and the hard minimums.

```
total_min = tot_dmin = 0;
for (i=0; i<num_mem; i++)
    tot_min = tot_min + min_br[i];
if (tot_min > br_avail){   /* we don't have enough for all mins */;
    for (i=0; i<num_mem; i++)
        tot_dmin = tot_dmin + (min_br[i] − hminbr[i]);
    if (tot_hmin > br_avail){
        for (i=0; i<num_mem; i++) /* allocate proportional to minbr[i] */
            bit_rate[i] = br_avail * minbr[i] / tot_min;
    }
    else{
        for (i = 0; i < num_mem; i++){
            bit_rate[i] = hminbr[i]; /* allocate hard minimums first */
            br_avail = br_avail − hminbr[i];
        }
        if (br_avail > 0){
            for (i = 0; i < num_mem; i++)
                bit_rate[i] = bit_rate[i] + br_avail *
                (min_br[i] − hminbr[i] / tot_dmin;     /* use diff in requested
                                                         and hard mins */
        }
    }
    /* at this point no more br_avail */
    br_avail = 0;
}
```

(4) If the total minimum bit rate requested by the packet processor of a channel does not exceed the available bandwidth, then allocate the minimum requested bandwidth to each channel, and adjust the target bit rate for each channel.
```
tot_target_br = 0;
for (i=0;i<num_mem;i++){
br_avail=br_avail − min_br[i];
bit_rate[i] = min_br[i];
if (target_br[i] > min_br[i])
    target_br[i] = target_br[i] − min_br[i];
else
    target_br[i] = 0;
tot_target_br = tot_target_br + target_br[i];
}
```
(5) If there is still bandwidth available, distribute it in proportion to the channels' target bandwidths.
```
sav_bravail = br_avail;
if (br_avail > 0){
for (i=0; i<num_mem; i++){
    if (tot_target_br != 0){
        bit_rate[i] = bit_rate[i] + (sav_bravail * target_br[i] /
            tot_target_br);
        br_avail = br_avail − (sav_bravail * target_br[i] /tot_target_br);
    }
    if (bit_rate[i] > max_br[i]){
        bit_rate[i] = max_br[i];
        br_avail = br_avail + (bit_rate[i] − max_br[i]);
    }
}
}
```
(6) If there is still bandwidth available, distribute it in proportion to the difference between the max_bitrate and the bit rate assigned, without exceeding the max_bitrate.
```
if (br_avail > 0){
tot_excess_br = 0;
for (i=0; i<num_mem; i++){
    if (bit_rate[i] < max_br[i])
        excess_br[i] = max_br[i]−bit_rate[i];
    else
        excess_br[i] = 0;
    tot_excess_br = tot_excess_br + excess_br[i];
}
if (tot_excess_br <= br_avail){
    for(i=0; i<num_mem; i++)
        bit_rate[i] = max_br[i];
    br_avail = br_avail − tot_excess_br;
}
else{
    for (i=0; i<num_mem; i++)
        bit_rate[i] = bit_rate[i] + br_avail * excess_br[i]/tot_excess_br;
}
}
```

Figure 5B:
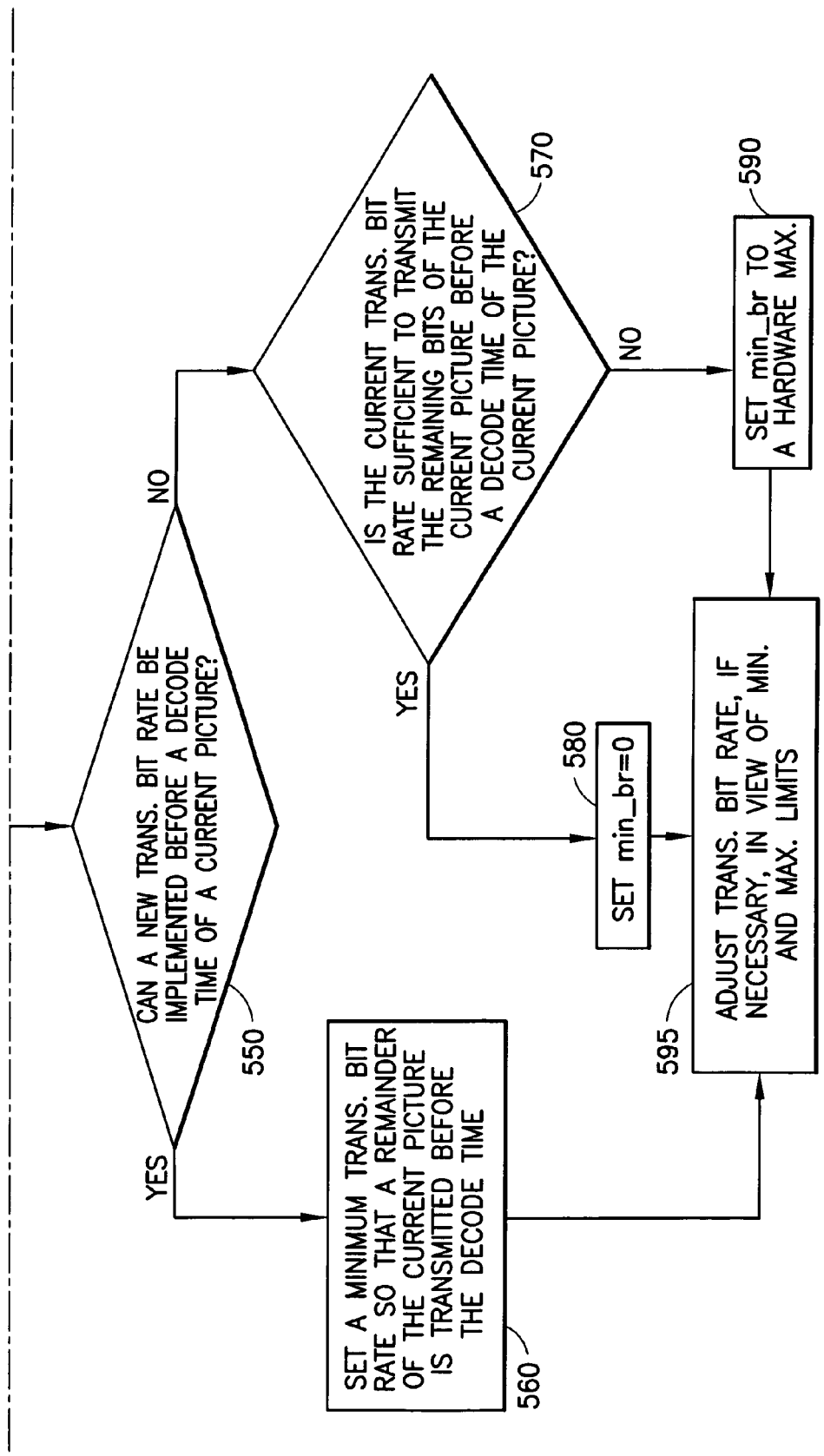
FIGS. 5 (a) and 5 (b) illustrate a method for setting minimum and maximum limits on a transmission bit rate in accordance with the present invention.

FIGS. 5 (*a*) and 5 (*b*) illustrate a method for setting minimum and maximum limits on a transmission bit rate in accordance with the present invention. A summary of the above discussions is provided.

An encoding bit rate is first allocated for a current picture (block 500), and a transmission bit rate is allocated in response thereto (block 510), and following a system delay. If a new bit rate can be allocated before a decode time of the next picture (block 520), a max. bit rate limit is set to avoid a decoder buffer overflow at the decode time of the next picture (block 530). If a new bit rate can not be allocated before the decode time of the next picture (block 520), a max. bit rate limit is set to avoid a decoder buffer overflow at the decode time of the next, next picture (block 540).

For setting a minimum limit on the transmission bit rate (550), e.g., to avoiding a possible decoder buffer underflow, if a new bit rate can be allocated before the decode time of the current picture, the min. bit rate is set so that a remainder of the current picture is transmitted before the decode time of the current picture (block 560). If a new bit rate can not be allocated before the decode time of the current picture, a determination is made as to whether the current transmission bit rate is sufficient to transmit the remainder of the current picture before the decode time of the current picture (block 570). If the current bit rate is sufficient, the min. bit rate is set to zero (block 580) since there is no need to force the bit rate higher. If the current bit rate is not sufficient, the min. bit rate is set to a maximum value, such as a hardware maximum (block 590), to force the bit rate to the highest possible level to mitigate any possible buffer underflow at the decode time of the current picture.

The transmission bit rate for the current picture is adjusted as necessary in view of the min. and max. limits (block 595). The processing then repeats for the next transmission bit rate allocation cycle. The min. and max. limits take into account a delay in implementing a new bit rate, and also account for whether the new bit rate can be implemented before the decoding time of the current picture, the next picture, and/or the next, next picture.

Accordingly, it can be seen that the present invention provides a statistical multiplexer for coding and multiplexing multiple channels of digital television data. A bit rate need parameter is determined for each encoder in a stat mux group, and an encoding bit rate is allocated to each channel based on its need parameter.

Additionally, a transmission bit rate is allocated to each channel as a time-lagged version of its need parameter to minimize a rate mismatch between the output and the input of a decoder buffer. A packet processor checks for impending decoder buffer overflow or underflow events to set minimum and maximum limits on the transmission bit rate.

Although the invention has been described in connection with various preferred embodiments, it should be appreciated that various modifications and adaptations may be made thereto without departing from the scope of the invention as set forth in the claims.

What is claimed is:

1. A method for processing a plurality of channels in a statistical multiplexer, comprising the steps of:
    allocating an encoding bit rate for coding a current picture of each channel according to a bit rate need parameter thereof; and
    for each channel, allocating a transmission bit rate for transmitting the current picture after encoding thereof, and providing a modeled decoder buffer that receives transmitted pictures therefrom;
    wherein, for each channel, the transmission bit rate is based on the channel's encoding bit rate, and is allocated following a system delay that follows the allocated encoding bit rate, to minimize a rate mismatch between an input and an output of the modeled decoder buffer, and
    wherein for at least one of the channels, when a next update of the allocated transmission bit rate can be implemented, following an implementation delay, before a decode time of a next picture, a maximum limit is set on the allocated transmission bit rate at a current time (CT) in proportion to a fullness of the modeled decoder buffer at a time (CT+delay), and in inverse proportion to a time period between (CT+delay) and the decode time.

2. A method for processing a plurality of channels in a statistical multiplexer, comprising the steps of:
    allocating an encoding bit rate for coding a current picture of each channel according to a bit rate need parameter thereof; and
    for each channel, allocating a transmission bit rate for transmitting the current picture after encoding thereof, and providing a modeled decoder buffer that receives transmitted pictures therefrom;
    wherein, for each channel, the transmission bit rate is based on the channel's encoding bit rate, and is allocated following a system delay that follows the allocated encoding bit rate, to minimize a rate mismatch between an input and an output of the modeled decoder buffer, and
    wherein for at least one of the channels, when a next update of the allocated transmission bit rate can not be implemented, following an implementation delay, before a decode time of a next picture, a maximum limit is set on the allocated transmission bit rate at a current time (CT) in proportion to a fullness of the modeled decoder buffer at a time (CT+delay), and in inverse proportion to a time period between (CT+delay) and a decode time of a picture that follows said next picture.

3. A method for processing a plurality of channels in a statistical multiplexer, comprising the steps of:
    allocating an encoding bit rate for coding a current picture of each channel according to a bit rate need parameter thereof; and
    for each channel, allocating a transmission bit rate for transmitting the current picture after encoding thereof, and providing a modeled decoder buffer that receives transmitted pictures therefrom;
    wherein, for each channel, the transmission bit rate is based on the channel's encoding bit rate, and is allocated following a system delay that follows the allocated encoding bit rate, to minimize a rate mismatch between an input and an output of the modeled decoder buffer, and
    wherein for at least one of the channels, when a next update of the allocated transmission bit rate can be implemented, following an implementation delay, before a decode time of the current picture, a minimum limit is set on the allocated transmission bit rate at a current time (CT) in proportion to a number of remaining bits of the current picture to transmit at a time (CT+delay), and in inverse proportion to a time period between (CT+delay) and the decode time.

4. A method for processing a plurality of channels in a statistical multiplexer, comprising the steps of:
    allocating an encoding bit rate for coding a current picture of each channel according to a bit rate need parameter thereof; and
    for each channel, allocating a transmission bit rate for transmitting the current picture after encoding thereof, and providing a modeled decoder buffer that receives transmitted pictures therefrom;
    wherein, for each channel, the transmission bit rate is based on the channel's encoding bit rate, and is allocated following a system delay that follows the allocated encoding bit rate, to minimize a rate mismatch between an input and an output of the modeled decoder buffer, and, comprising the further step of:
    for at least one of the channels, determining whether a current allocated transmission bit rate is sufficient to transmit a number of remaining bits of the current picture in a time period between a current time and a decode time of the current picture, and, if so, maintaining the current allocated transmission bit rate in a next update cycle thereof.

5. A method for processing a plurality of channels in a statistical multiplexer, comprising the steps of:

allocating an encoding bit rate for coding a current picture of each channel according to a bit rate need parameter thereof; and for each channel, allocating a transmission bit rate for transmitting the current picture after encoding thereof, and providing a modeled decoder buffer that receives transmitted pictures therefrom;

wherein, for each channel, the transmission bit rate is based on the channel's encoding bit rate, and is allocated following a system delay that follows the allocated encoding bit rate, to minimize a rate mismatch between an input and an output of the modeled decoder buffer, and, comprising the further step of:

for at least one of the channels, forcing the allocated transmission bit rate to a maximum value in a next update cycle thereof when a current allocated transmission bit rate is not sufficient to transmit a number of remaining bits of the current picture in a time period between a current time and a decode time of the current picture.

6. A method for processing a plurality of channels in a statistical multiplexer, comprising the steps of:

allocating an encoding bit rate for coding a current picture of each channel according to a bit rate need parameter thereof; and for each channel, allocating a transmission bit rate for transmitting the current picture after encoding thereof, and providing a modeled decoder buffer that receives transmitted pictures therefrom;

wherein, for each channel, the transmission bit rate is based on the channel's encoding bit rate, and is allocated following a system delay that follows the allocated encoding bit rate, to minimize a rate mismatch between an input and an output of the modeled decoder buffer, and, wherein for at least one of the channels, when a next update of the allocated transmission bit rate can be implemented, following an implementation delay, before a decode time of a next picture, a maximum limit is set on the allocated transmission bit rate at a current time to avoid an overflow of the modeled decoder buffer at the decode time.

7. A method for processing a plurality of channels in a statistical multiplexer, comprising the steps of:

allocating an encoding bit rate for coding a current picture of each channel according to a bit rate need parameter thereof; and for each channel, allocating a transmission bit rate for transmitting the current picture after encoding thereof, and providing a modeled decoder buffer that receives transmitted pictures therefrom;

wherein, for each channel, the transmission bit rate is based on the channel's encoding bit rate, and is allocated following a system delay that follows the allocated encoding bit rate, to minimize a rate mismatch between an input and an output of the modeled decoder buffer, and, wherein for at least one of the channels, when a next update of the allocated transmission bit rate can not be implemented, following an implementation delay, before a decode time of a next picture, a maximum limit is set on the allocated transmission bit rate at a current time to avoid an overflow of the modeled decoder buffer at a decode time of a picture that follows said next picture.

8. A method for processing a plurality of channels in a statistical multiplexer, comprising the steps of:

allocating an encoding bit rate for coding a current picture of each channel according to a bit rate need parameter thereof; and for each channel, allocating a transmission bit rate for transmitting the current picture after encoding thereof, and providing a modeled decoder buffer that receives transmitted pictures therefrom;

wherein, for each channel, the transmission bit rate is based on the channel's encoding bit rate, and is allocated following a system delay that follows the allocated encoding bit rate, to minimize a rate mismatch between an input and an output of the modeled decoder buffer, and, wherein: for at least one of the channels, when a next update of the allocated transmission bit rate can be implemented, following an implementation delay, before a decode time of the current picture, a minimum limit is set on the allocated transmission bit rate at a current time such that the current picture is completely transmitted before the decode time.

9. A method for processing a plurality of channels in a statistical multiplexer, comprising the steps of:

allocating an encoding bit rate for coding a current picture of each channel according to a bit rate need parameter thereof; and for each channel, allocating a transmission bit rate for transmitting the current picture after encoding thereof, and providing a modeled decoder buffer that receives transmitted pictures therefrom;

wherein, for each channel, the transmission bit rate is based on the channel's encoding bit rate, and is allocated following a system delay that follows the allocated encoding bit rate, to minimize a rate mismatch between an input and an output of the modeled decoder buffer, and, wherein: for at least one of the channels, when a next update of the allocated transmission bit rate can not be implemented, following an implementation delay, before a decode time of the current picture, a minimum limit on the allocated transmission bit rate at a current time is set to a maximum value to mitigate a potential underflow of the modeled decoder buffer.

* * * * *